United States Patent
Okamoto

(10) Patent No.: US 8,488,427 B2
(45) Date of Patent: Jul. 16, 2013

(54) OPTICAL DISC APPARATUS CAPABLE OF PERFORMING RECORDING AND/OR REPRODUCING OF INFORMATION WITH REDUCING ABERRATION

(75) Inventor: Kenji Okamoto, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 859 days.

(21) Appl. No.: 12/010,858

(22) Filed: Jan. 30, 2008

(65) Prior Publication Data
US 2008/0181088 A1    Jul. 31, 2008

(30) Foreign Application Priority Data
Jan. 31, 2007   (JP) ................................. 2007-020386

(51) Int. Cl.
*G11B 7/00*   (2006.01)

(52) U.S. Cl.
USPC ....................................................... 369/53.19

(58) Field of Classification Search
None
See application file for complete search history.

(56) References Cited

U.S. PATENT DOCUMENTS

| | | | | |
|---|---|---|---|---|
| 6,807,017 B2 * | 10/2004 | Sasano et al. | ................. | 359/719 |
| 7,843,774 B2 * | 11/2010 | Nagura | ...................... | 369/44.23 |
| 7,907,498 B2 * | 3/2011 | Tanimoto et al. | ......... | 369/112.02 |
| 2002/0176331 A1 | 11/2002 | Ariyoshi et al. | ........... | 369/44.23 |
| 2003/0076767 A1 * | 4/2003 | Shimano et al. | ......... | 369/112.23 |
| 2006/0164951 A1 * | 7/2006 | Yamasaki et al. | ........ | 369/112.01 |
| 2006/0164953 A1 * | 7/2006 | Kim et al. | ................. | 369/112.01 |
| 2007/0104045 A1 * | 5/2007 | Nagura | ...................... | 369/44.23 |
| 2012/0030694 A1 * | 2/2012 | Mori | ............................ | 720/681 |

FOREIGN PATENT DOCUMENTS

| | | |
|---|---|---|
| EP | 1 542 212 A2 | 6/2005 |
| JP | 2004-171695 | 6/2004 |
| JP | 2005-158228 | 6/2005 |
| JP | 2005-228365 | 8/2005 |
| JP | 2005-332558 | 12/2005 |
| WO | WO 2006/003544 A1 | 1/2006 |
| WO | WO 2006/009227 A1 | 1/2006 |

\* cited by examiner

*Primary Examiner* — Adam R Giesy
*Assistant Examiner* — Emily Frank
(74) *Attorney, Agent, or Firm* — Morgan, Lewis & Bockius LLP

(57) ABSTRACT

An optical disc apparatus in accordance with the present invention includes: a plurality of light sources; an optical system which has at least an objective lens that condenses light beam emitted from the light sources on a recording layer of an optical disc and a collimator lens that is arranged between the light sources and the objective lens; a lens tilting mechanism which tilts the objective lens; a collimator lens driving mechanism which moves the collimator lens along an optical axis direction; and a most appropriate setting deciding portion which decides in a prescribed timing a most appropriate setting about position of the collimator lens and tilting of the objective lens while changing the position of the collimator lens and the tilting of the objective lens utilizing the collimator lens driving mechanism and the lens tilting mechanism.

15 Claims, 6 Drawing Sheets

F I G. 8
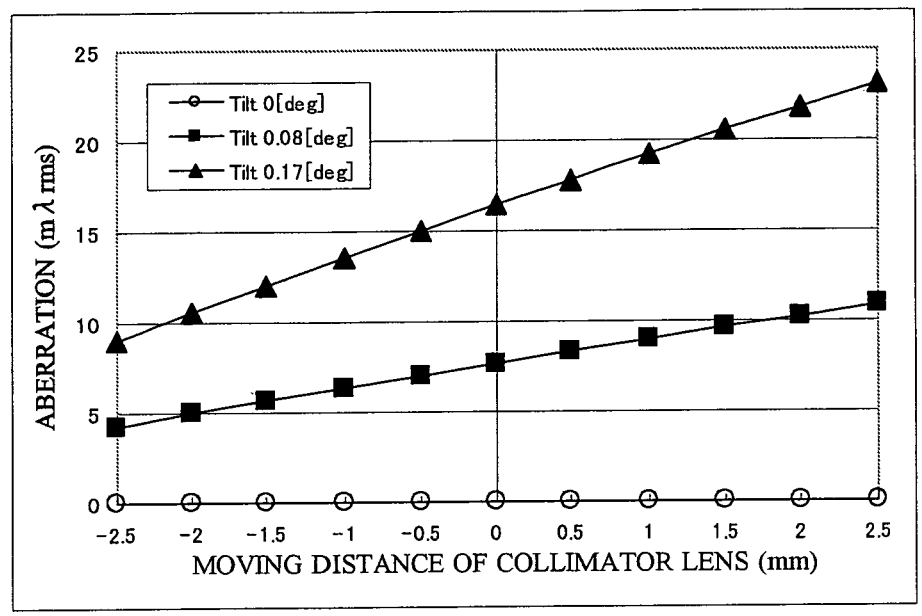

US 8,488,427 B2

OPTICAL DISC APPARATUS CAPABLE OF PERFORMING RECORDING AND/OR REPRODUCING OF INFORMATION WITH REDUCING ABERRATION

This application is based on Japanese Patent Application No. 2007-020386 filed on Jan. 31, 2007, and the contents of which are hereby incorporated by reference.

BACKGROUND OF THE INVENTION

1. Field of the Invention

The present invention relates to an optical disc apparatus which makes recording of information on an optical disc and/or reproducing of information recorded on an optical disc possible, and in particular, the present invention relates to a structure of the optical disc apparatus which can perform recording of information and/or reproducing of information with reducing aberration.

2. Description of Related Art

An optical disc such as a compact disc (hereinafter referred to as a CD), or a digital versatile disc (hereinafter referred to as a DVD) has become popular. In addition, recently, to increase amount of information to be recorded on the optical disc, a study about high density recording on the optical disc is advanced, and for example, an optical disc which can record large capacity of information such as a HD-DVD which is high definition DVD or a Blu-ray disc (hereinafter referred to as a BD) has begun to be put to practical use. Further, in order to increase amount of information that can be recorded on the optical disc, development about a multilayer optical disc on which a plurality of recording layers are set up in a thickness direction of the optical disc, is performed actively.

To reproduce information on such optical disc and to record information on the optical disc are performed utilizing an optical disc apparatus. Because a plurality of kinds of optical discs are utilized recently as above described, development of an optical disc apparatus that can perform reproducing or recording of information for the plurality of kinds of optical discs is performed actively.

By the way, the optical disc such as a CD, a DVD, a BD, or the like, includes a transparent covering layer (protect layer) for protecting a recording layer having different thickness according to its kind. For example, the thickness for a CD is 1.2 mm, that for a DVD is 0.6 mm, and that for a BD is 0.1 mm. Because of this, in an optical disc apparatus which can perform reproducing and recording of information for such optical disc that has different thickness of transparent covering layer there is a case where a problem is caused by generation of spherical aberration when recording or reproducing of the optical disc is performed. Further, when recording or reproducing of the optical disc which has a plurality of recording layers is performed, there is a case where a problem is caused by generation of the spherical aberration because thickness of protect layer becomes different according to position of the recording layer. At this point, in this description, an intermediate layer between two recording layers of the multilayer optical disc is also presumed as the protect layer.

In this regard, heretofore a method or the like is proposed by that correction of the spherical aberration which causes problem in the optical disc apparatus is performed by arranging spherical aberration correcting means such as liquid crystal element, an expander lens, and the like in an optical system (for example, see JP-A-2005-158228). Further, in methods for the correction of the spherical aberration which have been performed heretofore, there is a method to perform the correction of the spherical aberration by moving a collimator lens that is arranged in an optical system of an optical disc apparatus along an optical axis direction depending on a kind of the optical disc which is subject to be recorded or reproduced, and arranging the collimator lens most appropriately. In case of this method, it is effective because it has a merit that a structure of the optical system which is included in the optical disc apparatus can be simple and the like.

However, even in case where the method that the correction of the spherical aberration is performed by moving position of the collimator lens is utilized, there is a possibility that suppressing aberration which is generated in the optical system of the optical disc apparatus cannot be performed enough. In such a case, it causes a problem because quality of recording or reproducing by the optical disc apparatus is deteriorated.

SUMMARY OF THE INVENTION

In view of the above described problems, it is an object of the present invention to provide an optical disc apparatus which perform the correction of the spherical aberration by driving the collimator lens and which can suppress aberration that is generated in the optical system more appropriately.

To attain the above described object an optical disc apparatus in accordance with the present invention is characterized by including: a plurality of light sources; an optical system which has at least an objective lens that condenses light beam emitted from the light sources on a recording layer of an optical disc and a collimator lens that is arranged between the light sources and the objective lens; a lens tilting mechanism which tilts the objective lens; a collimator lens driving mechanism which moves the collimator lens along an optical axis direction; and a most appropriate setting deciding portion which decides in a prescribed timing a most appropriate setting about position of the collimator lens and tilting of the objective lens while changing the position of the collimator lens and the tilting of the objective lens utilizing the collimator lens driving mechanism and the lens tilting mechanism.

By this arrangement, in an optical pickup device which performs the correction of the spherical aberration by driving the collimator lens, it becomes possible to suppress not only the spherical aberration but also coma aberration appropriately and it becomes also possible to perform high quality recording or reproducing on which influence of the aberration is reduced when the recording or reproducing of the optical disc is performed.

Further, the present invention is characterized by that the prescribed timing may be any timing after the optical disc is loaded in the apparatus and before reproducing or recording of the optical disc is begun in the optical disc apparatus which is structured as above described.

By this arrangement, in the optical disc apparatus which can perform reproducing and/or recording of information for a plurality of kinds of optical discs that include protect layer having different thickness to protect the recording layer, it becomes possible to perform high quality recording or reproducing with suppressing the aberration appropriately.

Further, the present invention is characterized by that the prescribed timing may be a timing when a spot position of a light beam which is formed by the objective lens is moved to other recording layer in the optical disc apparatus which is structured as above described.

By this arrangement, in the optical disc apparatus which can perform reproducing and/or recording of information for a multilayer optical disc that has a plurality of recording layers, it becomes possible to perform high quality recording or reproducing with suppressing the aberration appropriately.

Further, the present invention is preferable that the optical system is assembled such that direction of the coma aberration which is generated in the light beam emitted from the light source and output from the objective lens, is made to be a specific one direction in the optical disc apparatus which is structured as above described.

By this arrangement, it becomes easy to realize a structure correcting the coma aberration by tilting the objective lens because direction of the coma aberration which is generated in the optical system included in the optical disc apparatus, is controlled to be a specific one direction.

Further, the present invention is preferable that the specific one direction is a direction in which correction of the coma aberration can be performed by tilting the objective lens utilizing the lens tilting mechanism in the optical disc apparatus which is structured as above described.

By this arrangement, in the optical disc apparatus which corrects the spherical aberration by driving the collimator lens, it is easy to realize an optical disc apparatus that can perform correction of the coma aberration, too.

Further, the present invention is preferable that the most appropriate setting deciding portion decides the most appropriate setting based on a reference index which designates quality of reproduced signal of the optical disc in the optical disc apparatus which is structured as above described.

By this arrangement, a structure which decides the most appropriate position of the collimator lens and the most appropriate tilting of the objective lens, can be realized easily.

Further, the present invention is characterized by that the reference index which designates quality of reproduced signal of the optical disc may be any of amplitude of tracking error signal, amplitude of RF signal, a jitter value, and an error rate that is obtained when the optical disc is reproduced in the optical disc apparatus which is structured as above described.

By this arrangement, a structure which decides the most appropriate position of the collimator lens and the most appropriate tilting of the objective lens, can be realized without introducing special devices or parts and an optical disc apparatus which can correct appropriately influence of the aberration can be provided with low cost.

BRIEF DESCRIPTION OF THE DRAWINGS

FIG. 8 is a graph to explain a point of problem in a method that position of the collimator lens is moved to perform the correction of the spherical aberration.

DETAILED DESCRIPTION OF THE PREFERRED EMBODIMENTS

Hereinafter content of the present invention will be described by way of embodiment in detail with reference to drawings. However, the embodiment shown here is mere one example, and the present invention is not limited to the embodiment shown here.

Figure 1:
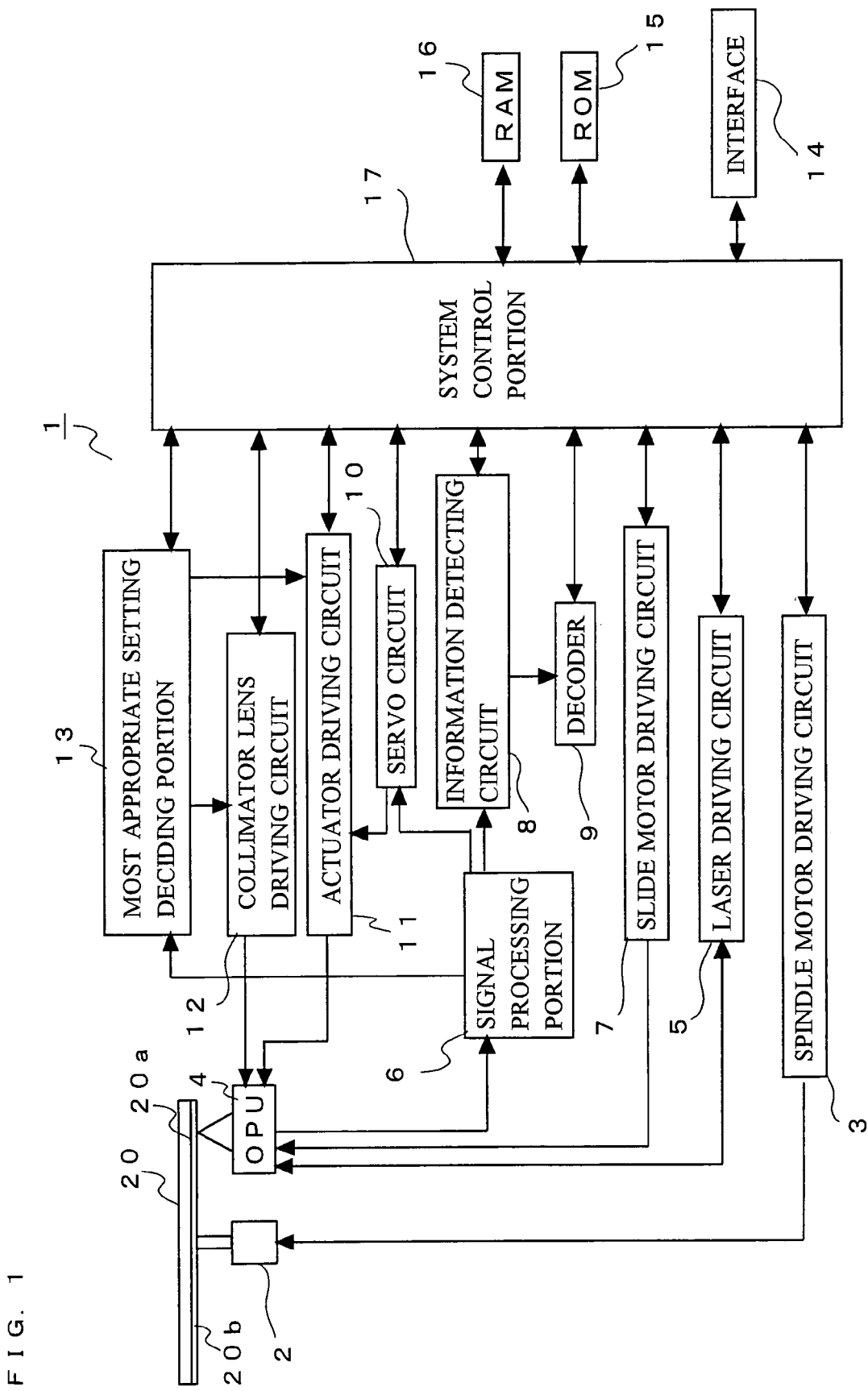
FIG. 1 is a block diagram to show a structure of an optical disc apparatus according to the present embodiment.

FIG. 1 is a block diagram to show a structure of an optical disc apparatus 1 according to the present embodiment. The optical disc apparatus 1 is set up to be capable of reproducing information recorded on an optical disc 20 and of recording information on the optical disc 20. The optical disc apparatus 1 according to the present embodiment is structured so as to be able to perform reproducing and recording of information for three kinds of optical discs 20 (a BD, a DVD, and a CD) which are different in thickness of the protect layer 20b to protect a recording layer 20a of the optical disc 20.

Reference numeral 2 designates a spindle motor and the optical disc 20 is held detachably by a chuck portion (not shown) which is set up above the spindle motor 2. The spindle motor 2 continuously rotates the optical disc 20 when recording or reproducing of information for the optical disc 20 is performed. Rotation control of the spindle motor 2 is performed by a spindle motor driving circuit 3.

Figure 6:
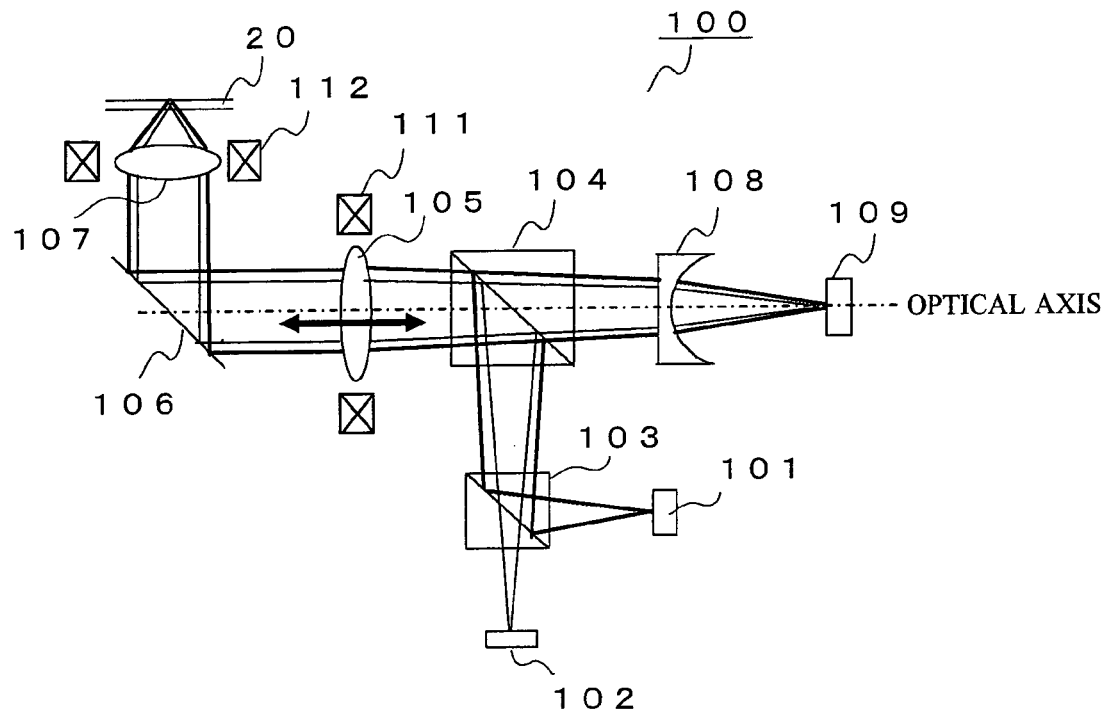
FIG. 6 is a schematic diagram to show a structure of the optical system of the optical pickup which is included in the optical disc apparatus according to the present embodiment.

Reference numeral 4 designates an optical pickup, which irradiates a laser beam that is emitted from a light source to the optical disc 20 to perform writing information on the optical disc 20 and reading information which is recorded on the optical disc 20. FIG. 6 is a schematic diagram to show a structure of an optical system 100 of the optical pickup 4 which is included in the optical disc apparatus 1 according to the present embodiment. At this point, in FIG. 6, light sources 101, 102 which emit the laser beam and a photo detector 109 which receives the laser beam (returned light) which is reflected by the optical disc 20 are also shown other than the optical system 100.

The optical system 100 which is included in the optical pickup 4 is structured such that correction of spherical aberration can be performed by moving position of a collimator lens. Further, the optical system 100 is structured so as to be compatible with a BD, a DVD, and a CD. The first light source 101 is a light source for a BD and it emits the laser beam having a wavelength of 405 nm band. The second light source 102 is a two wavelengths compatible light source for a DVD and a CD, and it emits by switching the laser beams having a wavelength of 650 nm band and a wavelength of 780 nm band.

A dichroic prism 103 reflects the laser beam which is emitted from the first light source 101 and transmits the laser beam which is emitted from the second light source 102. The laser beam which is emitted from the light sources 101, 102 and passes the dichroic prism 103, is reflected by a beam splitter 104 and passes the collimator lens 105.

The collimator lens 105 is made capable of moving along an optical axis direction (direction shown by arrow in FIG. 6) by a collimator lens driving mechanism 111. By this arrangement, position in the optical axis direction of the collimator lens 105 is arranged most appropriately to perform the correction of the spherical aberration that is generated at a laser beam spot condensed on the optical disc 20.

Figure 2:
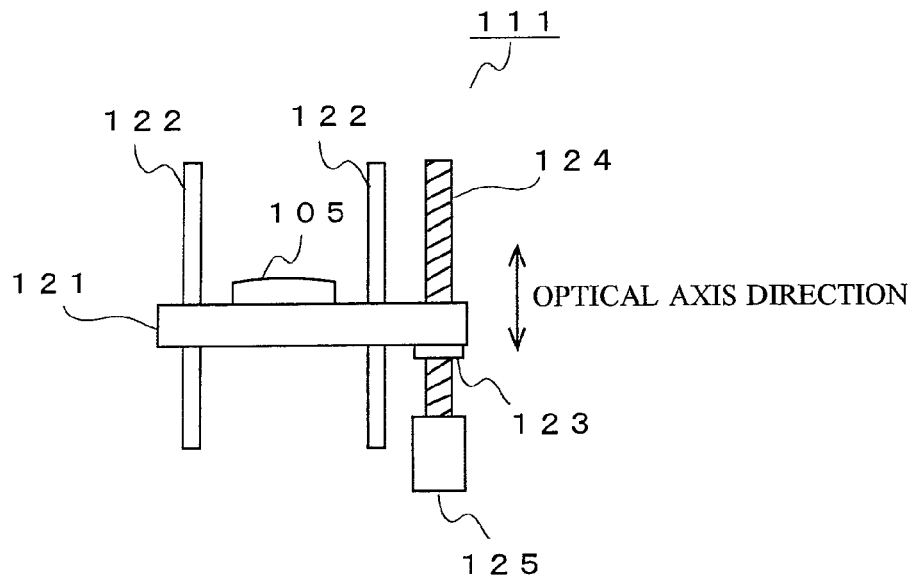
FIG. 2 is a schematic plan view to show a structure of collimator lens driving mechanism which is included in the optical disc apparatus according to the present embodiment.

FIG. 2 is a schematic plan view to show a structure of the collimator lens driving mechanism 111 which is included in the optical pickup 4. The collimator lens driving mechanism 111 includes a movable holder 121 which is set up in movable to hold the collimator lens 105, guiding rods 122 which guide the movable holder 121 so as to move along the optical axis direction, a lead screw 124 which engages with a lead nut 123 that is fixed on the movable holder 121, and a stepping motor 125 which rotates the lead screw 124. By these arrangement, the collimator lens 105 can be moved along the optical axis direction with the movable holder 121 by rotating the lead screw 124 utilizing the stepping motor 125. At this point, a structure of the collimator lens driving mechanism 111 is not intended to be limited to the structure shown here, and it is of course no problem that any other structure is employed as far as it can move the collimator lens 105 along the optical axis direction.

Now back to FIG. 6, the laser beam which passes the collimator lens 105 is reflected by an upstand mirror 106 and is condensed on the recording layer of the optical disc 20 by an objective lens 107. The objective lens 107 is mounted on an objective lens actuator 112, and by this arrangement, the objective lens 107 is made capable of moving in focusing direction which is a parallel direction to the optical axis direction at a position of the objective lens 107, and in tracking direction which is a parallel direction to a radial direction of the optical disc 20. As a result, adjustment of focusing and tracking are made possible when the optical disc 20 is recorded or reproduced. Further, the objective lens actuator 112 is made possible to tilt the objective lens 107 by rotating the objective lens 107 in a direction around an axis which is orthogonal to both of the focusing direction and the tracking direction.

Figure 3A:
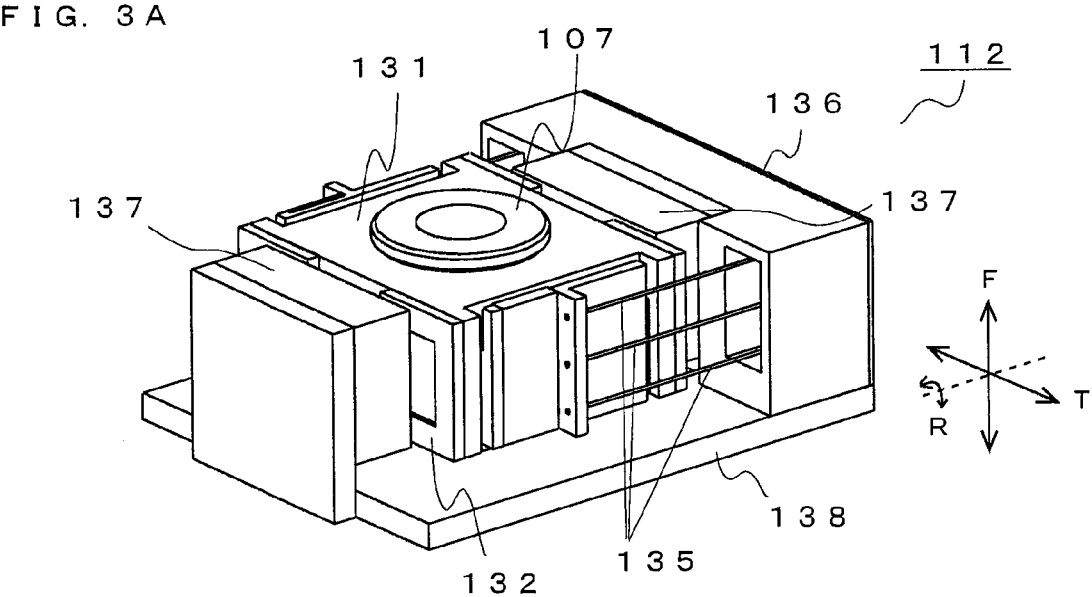
FIG. 3A is a schematic perspective view to show a structure of objective lens actuator which is included in the optical disc apparatus according to the present embodiment.
Figure 3B:
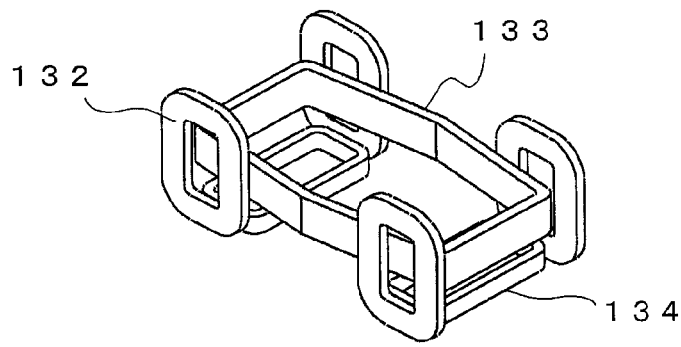
FIG. 3B is a schematic perspective view to show a structure of coil which is included in the objective lens actuator according to the present embodiment.

FIG. 3A and FIG. 3B are diagrams to show a structure of the objective lens actuator 112 which is included in the optical disc apparatus 1 according to the present embodiment, FIG. 3A is a schematic perspective view to show the structure of the objective lens actuator 112, and FIG. 3B is a schematic perspective view to show a structure of a coil which is included in the objective lens actuator 112.

As shown in FIG. 3A, the objective lens actuator 112 is an objective lens actuator of so called a wire supported type. Because the objective lens actuator of this structure is well known in its structure, it will be explained only concisely in below. In the objective lens actuator 112, the objective lens 107 is mounted on a lens holder 131. The lens holder 131 is supported in swingable manner by wires 135 one end of which are fixed on the lens holder 131, and another end of which are fixed on a circuit board 136 that is formed to stand on a base 138. Further, permanent magnets 137 are formed to stand on the base 138 such that they are arranged in symmetrical position to sandwich the lens holder 131.

On the lens holder 131, four tracking coils 132 which are arranged as two pairs on respective outer side walls of the lens holder 131 in symmetrical positions, a focusing coil 133 which is arranged on inner side wall of the lens holder 131 so as to surround the optical axis of the objective lens 107, and two tilting coils 134 which are arranged in symmetrical positions below the focusing coil 133 inside of the lens holder 131, are set up. To these coils 132-134, electric currents are supplied via wires 135.

Because the objective lens actuator 112 is structured as above described, when electric current passes the tracking coils 132, the objective lens 107 is moved with the lens holder 131 along the tracking direction T (direction that is parallel to the radial direction of the optical disc 20) by electromagnetic action with magnetic field which is formed by the permanent magnets 137 in response to direction to which the electric current passes and intensity of the electric current. Similarly, when electric current passes the focusing coil 133, the objective lens 107 is moved along the focusing direction F (direction that is parallel to the optical axis) in response to direction and intensity of the electric current.

Further, when electric current passes the tilting coils 134, the objective lens 107 is rotated in an direction R around an axis (axis that is shown in FIG. 3A by dotted line) which is orthogonal to both of the focusing direction and the tracking direction in response to direction and intensity of the electric current. By this rotation, the objective lens 107 is tilted. That is to say, the objective lens actuator 112 functions as a lens tilting mechanism to tilt the objective lens 107. At this point, a structure of the lens tilting mechanism to tilt the objective lens 107 is not intended to be limited to this embodiment, and various modifications may be introduced within a range which does not depart from object of the present invention. Further, in the present embodiment a structure is employed in that the objective lens actuator is so called the wire supported type. However, the present invention is not limited to this type and it is no problem that the objective lens actuator is that of so called a shaft sliding type or the like, for example.

Now back to FIG. 6 again, the laser beam (returned light) which is reflected by the optical disc 20, passes the objective lens 107, and it is reflected by the upstand mirror 106. Then, the laser beam passes the collimator lens 105 and the beam splitter 104 and it is received on a receiving surface of the photo detector 109 via the condenser lens 108.

Figure 7:
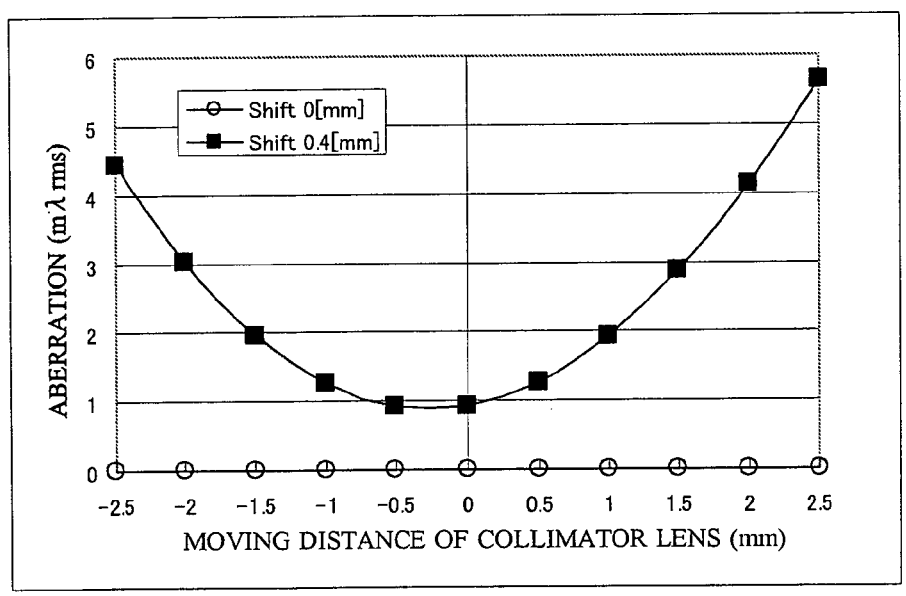
FIG. 7 is a graph to explain a point of problem in a method that position of the collimator lens is moved to perform the correction of the spherical aberration.

By the way, in the optical system 100 of the optical pickup 4, in case where a structure is employed in that the correction of the spherical aberration is performed by moving a position of the collimator lens 105 as the present embodiment, a problem which will be described below is caused. FIG. 7 is a graph to explain a point of problem in a method in which position of the collimator lens 105 is moved to perform the correction of the spherical aberration, this graph shows a state that the coma aberration is varied by movement of the collimator lens 105.

At this point, FIG. 7 is a result of simulation in case where the laser beam having wavelength of 405 nm is used utilizing a commercially available software for optical designing (made by ZEMAX Development Corporation, hereinafter referred to as ZEMAX). In this simulation, it is performed with an assumption that the coma aberration is not generated when the lens is manufactured and the optical system is assembled. Further, the word "shift" in FIG. 7 means amount of shift that the objective lens 107 is shifted along the tracking direction.

As shown in FIG. 7, when the objective lens 107 is not shifted, the coma aberration is not generated even if the collimator lens 105 is moved along the optical axis direction. However, when the objective lens 107 is shifted, the coma aberration is generated, and it can be seen that amount of generation of the coma aberration is varied depending on position of the collimator lens 105.

In case where reproducing or the like of the optical disc 20 is performed by the optical disc apparatus 1, because it is necessary to perform tracking adjustment, shift of the objective lens 107 is performed. By this reason, in case where a structure is employed in that position of the collimator lens 105 is moved to perform the correction of the spherical aberration, because amount of the coma aberration which is generated by the shift of the objective lens 107, is varied depending on the position of the collimator lens 105, it causes a problem how the correction of the coma aberration is performed.

With regard to this, because a method to tilt the objective lens 107 (to make tilting) is utilized heretofore as a method to correct the coma aberration, it is conceivable that the correction of the coma aberration is performed such that amount of tilting the objective lens 107 is beforehand decided for every position where the collimator lens 105 is arranged in order to reduce influence of the coma aberration. However, as shown in FIG. 8, amount of generation of the coma aberration is varied when the collimator lens 105 is moved in a state where the objective lens 107 is tilted. Further, it can be seen that the variation of the amount of generation of the coma aberration which is accompanied by the movement of the collimator lens 105 is different depending on the amount of tilting of the objective lens 107. Because of this, it is not easy to beforehand decide the amount of tilting of the objective lens 107. Further, because the coma aberration is generated also by variation in manufacturing when the optical products are manufactured, it is quite difficult to correct the influence of the coma aberration with beforehand decision of the amount of the tilting.

At this point, similar to FIG. 7, FIG. 8 is a result of simulation in case where the laser beam having wavelength of 405 nm is used utilizing a commercially available software for the optical designing. Further, in this simulation too, it is performed with an assumption that the coma aberration is not generated when the lens is manufactured and the optical system is assembled. Still further, the word "tilt" in FIG. 8 means an angle (degree) of tilt that the objective lens 107 is tilted.

To solve the above described problem, in the optical disc apparatus 1 according to the present embodiment, a most appropriate setting deciding portion 13 (See, FIG. 1) is set up. Detail of function of the most appropriate setting deciding portion 13 will be described later.

Further, in the present embodiment, the optical system 100 of the optical pickup 4 is formed such that direction of the coma aberration which is generated in the laser beam output from the objective lens 107 becomes a specific one direction when it is manufactured. In the present embodiment this specific one direction is a direction in that the coma aberration can be corrected by tilting the objective lens 107 utilizing the objective lens actuator 112.

Figure 4A:
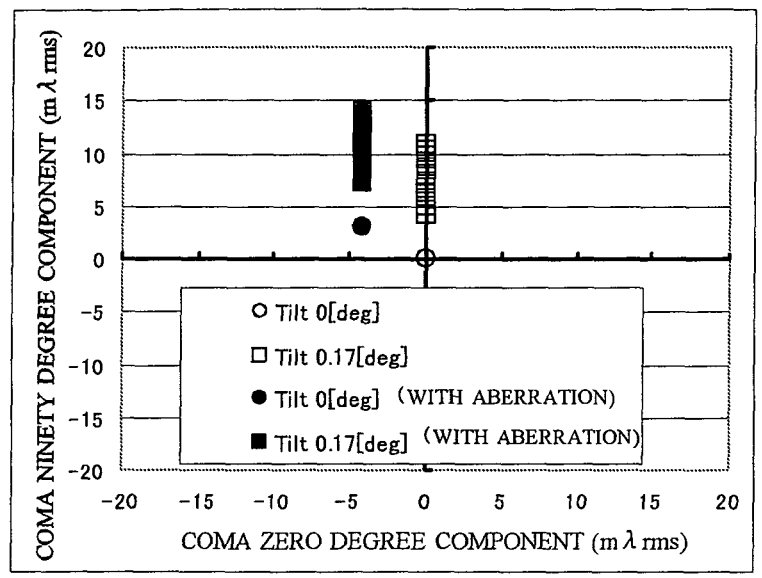
FIG. 4A is a graph to explain reason why direction of coma aberration is taken into consideration which is generated in the optical system of an optical pickup that is included in the optical disc apparatus according to the present embodiment, and the graph shows the coma aberration which is generated in case where the direction of the coma aberration is not taken into consideration.
Figure 4B:
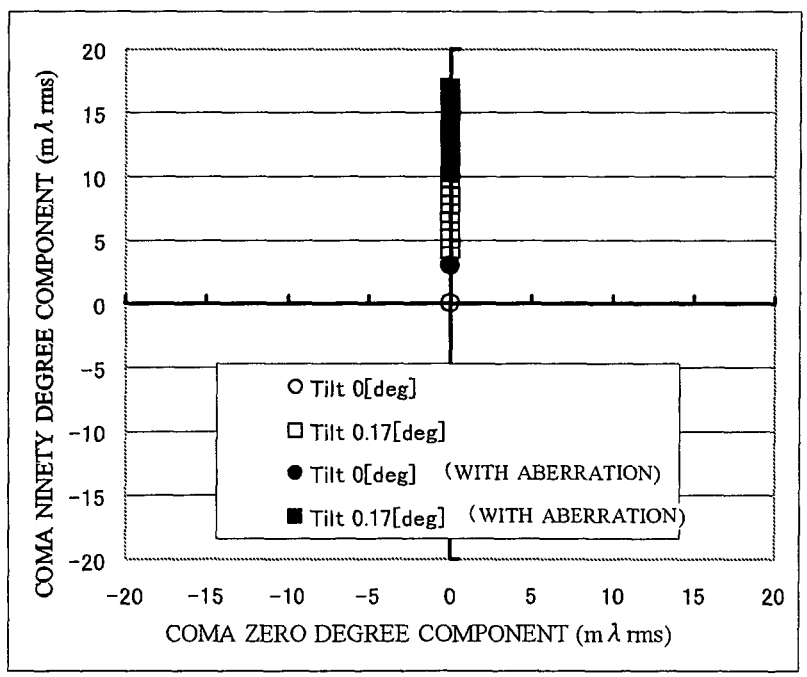
FIG. 4B is a graph to explain reason why direction of the coma aberration is taken into consideration which is generated in the optical system of an optical pickup that is included in the optical disc apparatus according to the present embodiment, and the graph shows the coma aberration which is generated in case where the direction of the coma aberration is taken into consideration.

About reason why the direction of the coma aberration which is generated in the laser beam output from the objective lens 107 is controlled so as to be the specific one direction as above described, will be explained with reference to FIG. 4A and FIG. 4B. FIG. 4A and FIG. 4B are graphs to explain the reason why direction of the coma aberration generated in the optical system 100 of the optical pickup 4, is taken into consideration, FIG. 4A shows the coma aberration which is generated in case where the direction of the coma aberration is not taken into consideration and FIG. 4B shows the coma aberration which is generated in case where the direction of the coma aberration is taken into consideration. At this point, FIG. 4A and FIG. 4B are made using result of the simulation utilizing the commercially available software for optical designing (ZEMAX). Further, the terms "the coma aberration zero degree component" and "the coma aberration ninety degree component" are concepts that are introduced to designate the coma aberration by two orthogonal components.

In FIG. 4A and FIG. 4B, a white circle mark designates a result of a case where the optical system 100 is an idealized one in that no aberration is generated and the objective lens 107 is not tilted, a white square mark designates a result of a case where the optical system 100 is an idealized one in that no aberration is generated and the objective lens 107 is tilted in the specific direction, a black circle mark designates a result of a case where the light that passes the optical system 100 contains the coma aberration and the objective lens 107 is not tilted, and a black square mark designates a result of a case where the light that passes the optical system 100 contains the coma aberration and the objective lens 107 is tilted in the specific direction. At this point, when the objective lens 107 is tilted, values of the coma aberration (the coma aberration ninety degree component) are varied, this is because the graph shows the result where amount of the coma aberration is varied by movement of the collimator lens 105.

If the direction of the coma aberration is not controlled when the optical system 100 is assembled, the coma aberration caused by the optical system 100 is usually generated with its direction not specified. Further, as shown in FIG. 4A, in case where the direction of the coma aberration has both of the coma aberration zero degree component and the coma aberration ninety degree component in FIG. 4A, the coma aberration is not completely cancelled even when the objective lens 107 is tilted in the direction in which the coma aberration ninety degree component is cancelled. Similarly, the coma aberration is not completely cancelled even when the objective lens 107 is tilted in the direction in which the coma aberration zero degree component is cancelled. As a result, it is understood that the coma aberration is not cancelled in cases which are designated by black marks in FIG. 4A because the objective lens 107 can be tilted only in specific direction by the objective lens actuator 112.

On the other hand, as shown in FIG. 4B, if the optical system 100 is structured such that the coma aberration is generated only in the specific one direction (in FIG. 4B the optical system is structured such that the coma aberration is generated only in the coma aberration ninety degree component), it becomes possible to cancel the coma aberration by tilting the objective lens 107 only in the specific direction. For this purpose in the present embodiment, the direction of the coma aberration which is generated in the laser beam output from the objective lens 107, is made to be the specific one direction when the optical system 100 of the optical pickup 4 is assembled.

At this point, as for a method to control the direction of the coma aberration which is generated in the laser beam output from the objective lens 107 to be the specific one direction when the optical system 100 of the optical pickup 4 is assembled, a method and the like in which the direction of generation of the aberration is checked in a step of manufacturing optical elements such as an objective lens and the like, the direction is marked on the optical element beforehand, and the element is assembled using the marking, for example, can be listed.

Now back to FIG. 1, a laser driving circuit 5 controls switching of wavelengths of the laser beam (wavelengths for a CD, a DVD, and a BD) which are emitted from the light source 101, 102, and controls laser power by intensity of light which is received utilizing a photo receiving element (not shown) for front monitoring.

A signal processing portion 6 is supplied electric signal from the photo detector 109 (See, FIG. 6), and performs processing of the supplied electric signal to generate RF signal, focus error signal (FE signal), and tracking error signal (TE signal).

A slide motor driving circuit 7 controls driving of a slide motor (not shown) which is set up to make the optical pickup 4 movable in the radial direction of the optical disc 20 based on an instruction from a system control portion 17.

An information detecting circuit 8 performs processing of waveform equalization and the like on the RF signal supplied from the signal processing portion 6 to perform reading out of the information which is recorded on the optical disc 20, and output the read out information to a decoder 9.

The decoder 9 performs demodulation of data and at the same time detects error in the data. When the error is detected, it performs a correction process of the data if it can be corrected. The reproduced data obtained by the decoder 9 is output to external devices such as a personal computer and the like via an interface 14. At this point, the decoder 9 performs a role to supply an error rate which is a rate of generation of read error of the data, to the system control portion 17.

A servo circuit 10 performs generation of focus driving signal and tracking driving signal based on the FE signal and the TE signal which are generated by the signal processing portion 6.

An actuator driving circuit 11 controls driving of objective lens actuator 112 on which the objective lens 107 is mounted, based on signals such as the focus driving signal, the tracking driving signal, and the like which are supplied from the servo circuit 10. By this arrangement, the objective lens actuator 112 performs focusing control and tracking control by moving the objective lens 107 in the focusing direction and the tracking direction. Further, the actuator driving circuit 11 performs a role to suppress generation of the coma aberration by controlling the objective lens actuator 112 to make tilting of the objective lens 107 the most appropriate setting based on an instruction from a most appropriate setting deciding portion 13 which will be described later.

A collimator lens driving circuit 12 controls driving of the collimator lens driving mechanism 111 based on an instruction from the most appropriate setting deciding portion 13 which will be described later.

The most appropriate setting deciding portion 13 makes instructions to drive the collimator lens driving mechanism 111 and the objective lens actuator 112 when kind of the optical disc 20 to be performed recording or reproducing by the optical disc apparatus 1 is changed (including a case where some kind of the optical disc is loaded on the optical disc apparatus 1 in which no disc is loaded till then). Then, the most appropriate setting deciding portion 13 decides the most appropriate setting of position of the collimator lens 105 and the tilting of the objective lens 107 by variously changing the position of the collimator lens 105 and the tilting of the objective lens 107. Detail of processes to decide the most appropriate setting of position of the collimator lens 105 and the tilting of the objective lens 107 by the most appropriate setting deciding portion 13 will be described later.

A system control portion 17 includes a microcomputer to adequately achieve control processes in response to required operations which are achieved by respective portions composing the optical disc apparatus 1. At this point, in the system control portion 17 Read Only Memory (ROM) 15 and Random Access Memory (RAM) 16 are set up. In the ROM 15, various parameters and operating programs which are required for the system control portion 17 to achieve various processes, are stored. The RAM 16 is used as a working region for the system control portion 17 and it is made as a storing region for various kinds of data which are required.

Figure 5:
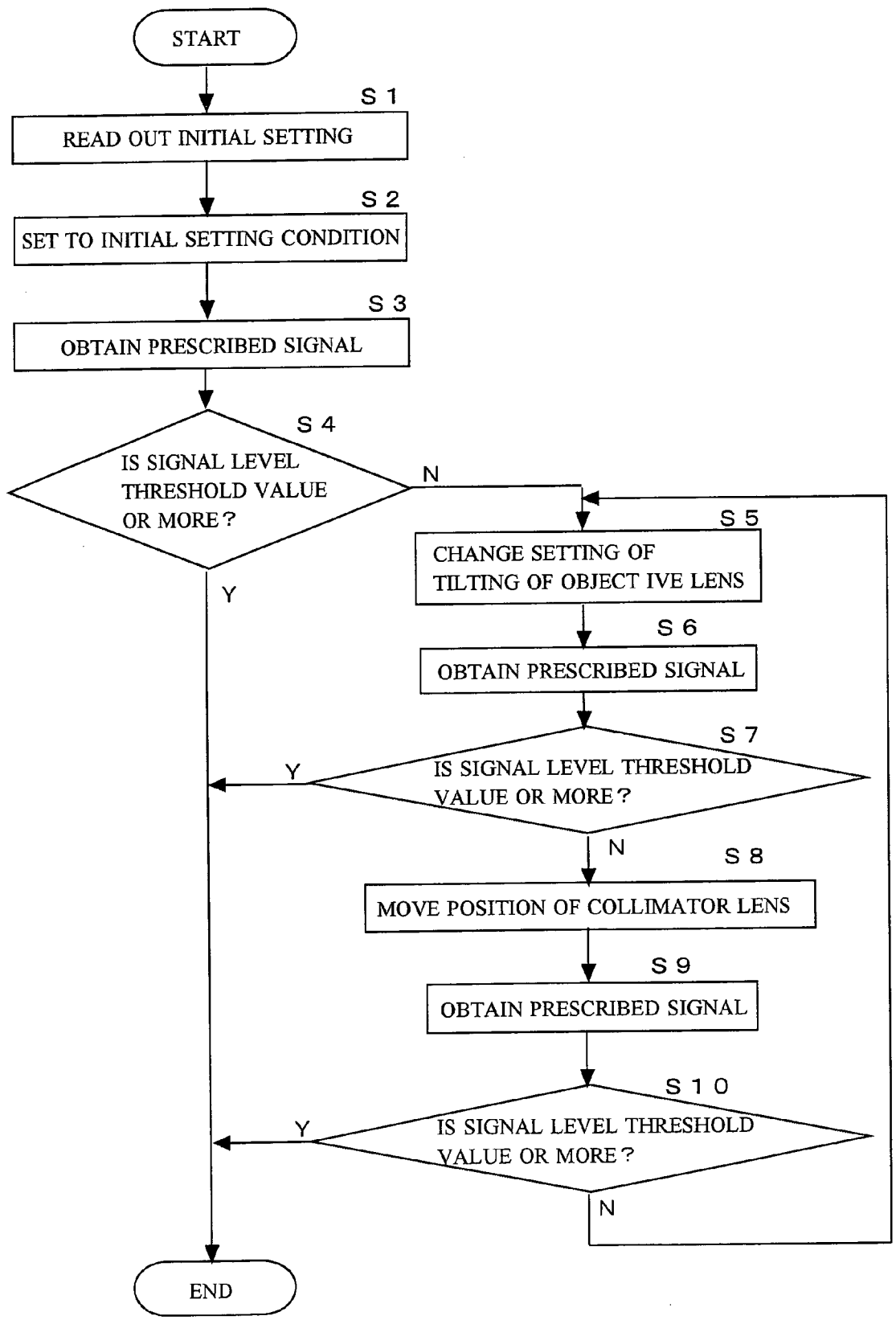
FIG. 5 is a flowchart to show processes to make position of the collimator lens and tilting of the objective lens the most appropriate setting by a most appropriate setting deciding portion which is included in the optical disc apparatus according to the present embodiment.

Next, the processes to decide the most appropriate setting of position of the collimator lens 105 and the tilting of the objective lens 107 by the most appropriate setting deciding portion 13 in case where kind of the optical disc 20 to be loaded in the optical disc apparatus 1 is changed, will be explained with reference to FIG. 5. At this point, reason why the position of the collimator lens 105 and the tilting of the objective lens 107 are made the most appropriate setting is to perform recording and reproducing with suppressing influence of the spherical aberration and the coma aberration when the optical disc 20 is recorded or reproduced by the optical disc apparatus 1. FIG. 5 is a flowchart to show processes to make the position of the collimator lens 105 and the tilting of the objective lens 107 the most appropriate setting by the most appropriate setting deciding portion 13.

If it is judged that the kind of the optical disc 20 is changed (including a case where some kind of the optical disc is loaded on the optical disc apparatus 1 in which no disc is loaded till then) by the system control portion 17, an instruction is output to the most appropriate setting deciding portion 13 to make the position of the collimator lens 105 and the tilting of the objective lens 107 the most appropriate setting. In response to the instruction, the most appropriate setting deciding portion 13 reads out an initial setting condition which is set beforehand depending on the kind of the optical disc 20 from the ROM 15 (Step S1).

The most appropriate setting deciding portion 13 outputs instructions to the collimator lens driving circuit 12 and the actuator driving circuit 11 so as to realize the initial setting condition which is read out. The collimator lens driving circuit 12 drives the collimator lens driving mechanism 111 according to the instruction to set the position of the collimator lens 105 as that of the initial setting condition (Step S2). The actuator driving circuit 11 drives the objective lens actuator 112 according to the instruction to set the tilting of the objective lens 107 as a value in the initial setting condition (Step S2, also).

When the position of the collimator lens 105 and the tilting of the objective lens 107 are made as the initial setting condition, a laser beam having wavelength corresponding to the respective optical discs 20 is emitted from the light sources 101, 102 to obtain a prescribed signal through the photo detector 109 (Step S3). In the present embodiment, a structure is employed in which the tracking error signal is obtained as the prescribed signal, and amplitude of this tracking error signal is used as a reference index that designates quality of the reproduced signal. At this point, the larger amplitude of the tracking error signal means the higher quality of the reproduced signal.

Processes to obtain this tracking error signal will be explained. When the laser beam is emitted, focusing control by the objective lens actuator 112 is started in order that focal point is kept on the recording surface of the optical disc 20. Next, the optical disc 20 is rotated in one rotation in a state where the tracking control utilizing the objective lens actuator 112 is not performed such that the tracking error signal for one rotation cycle which is caused only by eccentricity of the optical disc 20 is generated by the signal processing portion 6. The tracking error signal which is generated by the signal processing portion 6 is sent to the most appropriate setting deciding portion 13 and the most appropriate setting deciding portion 13 obtains the tracking error signal.

At this point, in the present embodiment a structure is employed in that the tracking error signal is obtained using the following the laser beam irradiated onto the recording layer 20a of the optical disc 20 transverses track of the optical disc 20 by eccentricity that is generated by shift between center of the optical disc 20 and rotational axis of the spindle motor 2 (See, FIG. 1). However, because there is a possibility that none of the eccentricity exists, it is no problem that a structure or the like in which a prescribed vibration is added to the objective lens 107 by the objective lens actuator 112 in order to vibrate the objective lens 107 in the tracking direction is employed.

The most appropriate setting deciding portion 13 seeks amplitude of the signal from the tracking error signal which is obtained as above described, compares it with a threshold value that is stored beforehand in the ROM 15 to confirm whether the amplitude of the tracking error signal is the threshold value or more, or not (Step S4). In this step if the amplitude of the tracking error signal is the threshold value or more, it is judged that the spherical aberration and the coma aberration can be suppressed by the initial setting condition. That is to say, the most appropriate setting deciding portion 13 judges that the initial setting condition is the most appropriate setting, and the system ends operation to decide the most appropriate setting of the position of the collimator lens 105 and the tilting of the objective lens 107.

On the other hand, in case where the amplitude of the tracking error signal is smaller than the threshold value, it is judged that the spherical aberration and the coma aberration are not enough suppressed by the initial setting condition and the setting condition is not the most appropriate setting. Then, setting of the tilting of the objective lens 107 is changed firstly (Step S5). At this time, as for amount of changing the tilting of the objective lens 107, it is no problem that the amount may be decided beforehand, or a structure and the like in which the amount of changing is decided based on the amount of the amplitude of the tracking error signal which is obtained, for example, may be employed.

After the setting of the tilting of the objective lens 107 is changed, the tracking error signal is obtained by a similar manner as the step S3 (Step S6). Then the amount of the amplitude of the obtained tracking error signal is compared with the prescribed threshold value to confirm whether the amplitude of the obtained tracking error signal is the threshold value or more, or not (Step S7). In this step if the amplitude of the tracking error signal is the threshold value or more, it is judged that setting condition at the time is the most appropriate setting for the position of the collimator lens 105 and the tilting of the objective lens 107, and the system ends the operation to decide the most appropriate setting.

On the other hand, in case where the amplitude of the tracking error signal is still smaller than the threshold value, it is judged that the spherical aberration and the coma aberration are not enough suppressed by the setting condition in that step and the setting condition is not the most appropriate setting. Then, setting of position of the collimator lens 105 is changed (Step S8). At this time, as for amount of movement of the collimator lens 105, it is no problem that the amount may be decided beforehand, or a structure and the like in which the amount of movement is decided based on the amount of the amplitude of the tracking error signal which is obtained, for example, may be employed.

After the setting of the position of the collimator lens 105 is changed, the tracking error signal is obtained by a similar manner as the step S3 (Step S9). Then the amount of the amplitude of the obtained tracking error signal is compared with the prescribed threshold value to confirm whether the amplitude of the obtained tracking error signal is the threshold value or more, or not (Step S10). In this step if the amplitude of the tracking error signal is the threshold value or more, it is judged that setting condition at that time is the most appropriate setting for the position of the collimator lens 105 and the tilting of the objective lens 107, and the system ends the operation to decide the most appropriate setting.

On the other hand, in case where the amplitude of the tracking error signal is still smaller than the threshold value, it is judged that the spherical aberration and the coma aberration are not enough suppressed by the setting condition in that step and the setting condition is not the most appropriate setting. Then, processes after step S5 are repeated until the most appropriate setting of the position of the collimator lens 105 and the tilting of the objective lens 107 are obtained.

At this point, the processes to decide the most appropriate setting of the position of the collimator lens 105 and the tilting of the objective lens 107 by the most appropriate setting deciding portion 13 is not intended to be limited to the above described embodiment, and various modifications may be introduced within a range which does not depart from object of the present invention. That is, for example, in the above described embodiment, in case where the initial setting condition is not the most appropriate setting, the processes are employed in that firstly the tilting of the objective lens 107 is changed, next the position of the collimator lens 105 is moved. However, it is no problem that the order is reversed. Further, the present embodiment employs the structure in which judgment whether the spherical aberration and the coma aberration are properly suppressed or not is performed using the amplitude of the tracking error signal, but the present invention is not intended to be limited the embodiment. That is to say, any reference index which designates quality of the reproduced signal may be used, and it is no problem to use structures using amplitude of the RF signal, a jitter value, the error rate or the like other than the amplitude of the tracking error signal.

Further, in the above described embodiment, as an example, the present invention is applied to the optical disc apparatus 1 which can perform recording and reproducing of information for three kinds of optical discs 20 that have different thickness of the protect layers 20b respectively. However, the present invention is not limited to the structure and can be widely applied to any optical disc apparatus having a structure in that the correction of the spherical aberration is performed by moving the position of the collimator lens. That is to say, the present invention can be applied to an optical disc apparatus which can perform reproducing of information or reproducing and recording of information, for example, for an multilayer optical disc that has a plurality of recording layers in a thickness direction (the optical disc apparatus may be compatible to a plurality of kinds of optical discs which include the protect layers having different thickness, or may not), and the optical disc apparatus which performs the correction of the spherical aberration by moving the position of the collimator lens. In such a case, it is preferable that the most appropriate setting is decided about the position of the collimator lens and the tilting of the objective lens by the most appropriate setting deciding portion (deciding processes for the most appropriate setting by the most appropriate setting deciding portion, may be the same as the processes shown in FIG. 5), when spot position of the laser beam which is formed by the objective lens is moved to other recording layer (in case where layer transition is performed). Further, kind of the optical disc for which the optical disc apparatus can perform reproducing and recording of information is not limited to the structure described in the present embodiment (compatible to a BD/a DVD/a CD), the present invention can be widely applied to an optical disc apparatus that can perform reproducing and recording of information for an optical disc which is different kind from that described in the present embodiment.

In the embodiment described above, the optical disc apparatus is an apparatus which is capable of recording and reproducing, the present invention is not limited to the apparatus and can be applied to cases or the like that an optical disc apparatus is made for performing only reproducing.

What is claimed is:

1. An optical disc apparatus comprising:
   at least one light source;
   an optical system which has at least an objective lens that condenses light beam emitted from the light source on a recording layer of an optical disc and a collimator lens that is arranged between the light source and the objective lens;
   a lens tilting mechanism which tilts the objective lens;
   a collimator lens driving mechanism which moves the collimator lens along an optical axis direction; and
   a most appropriate setting deciding portion which, when the collimator lens needs to be moved, changes tilting of the objective lens utilizing the lens tilting mechanism so as to correct coma aberration generated by movement of the collimator lens and decides a most appropriate setting about the tilting of the objective lens.

2. The optical disc apparatus according to claim 1, wherein the most appropriate setting deciding portion decides a most appropriate setting about position of the collimator lens and the tilting of the objective lens while alternately changing the position of the collimator lens and the tilting of the objective lens.

3. The optical disc apparatus according to claim 1, wherein the collimator lens is moved after the optical disc is loaded in the apparatus and before reproducing or recording of the optical disc is begun.

4. The optical disc apparatus according to claim 3, wherein the optical system is assembled such that direction of the coma aberration which is generated in the light beam emitted from the light source and output from the objective lens, is made to be a specific one direction.

5. The optical disc apparatus according to claim 4, wherein the most appropriate setting deciding portion decides the most appropriate setting based on a reference index which designates quality of reproduced signal of the optical disc.

6. The optical disc apparatus according to claim 3, wherein the most appropriate setting deciding portion decides the most appropriate setting based on a reference index which designates quality of reproduced signal of the optical disc.

7. The optical disc apparatus according to claim 1, wherein the collimator lens is moved when a spot position of a light beam which is formed by the objective lens is moved to other recording layer.

8. The optical disc apparatus according to claim 7, wherein the optical system is assembled such that direction of the coma aberration which is generated in the light beam emitted from the light source and output from the objective lens, is made to be a specific one direction.

9. The optical disc apparatus according to claim 8, wherein the most appropriate setting deciding portion decides the most appropriate setting based on a reference index which designates quality of reproduced signal of the optical disc.

10. The optical disc apparatus according to claim 7, wherein the most appropriate setting deciding portion decides the most appropriate setting based on a reference index which designates quality of reproduced signal of the optical disc.

11. The optical disc apparatus according to claim 1, wherein the optical system is assembled such that direction of coma aberration which is generated in the light beam emitted from the light source and output from the objective lens, is made to be a specific one direction.

12. The optical disc apparatus according to claim 11, wherein the specific one direction is a direction in which correction of the coma aberration can be performed by tilting the objective lens utilizing the lens tilting mechanism.

13. The optical disc apparatus according to claim 11, wherein the most appropriate setting deciding portion decides the most appropriate setting based on a reference index which designates quality of reproduced signal of the optical disc.

14. The optical disc apparatus according to claim 1, wherein the most appropriate setting deciding portion decides the most appropriate setting based on a reference index which designates quality of reproduced signal of the optical disc.

15. The optical disc apparatus according to claim 14, wherein the reference index which designates quality of reproduced signal of the optical disc is any of amplitude of tracking error signal, amplitude of RF signal, a jitter value, and an error rate that is obtained when the optical disc is reproduced.

* * * * *